(12) United States Patent  
Min (10) Patent No.: US 7,633,556 B2  
(45) Date of Patent: Dec. 15, 2009

(54) VIDEO SIGNAL PROCESSING APPARATUS AND METHOD TO ENHANCE IMAGE SHARPNESS AND REMOVE NOISE

(75) Inventor: Kyung-sun Min, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 630 days.

(21) Appl. No.: 11/143,454

(22) Filed: Jun. 3, 2005

(65) Prior Publication Data

US 2005/0270425 A1   Dec. 8, 2005

(30) Foreign Application Priority Data

Jun. 8, 2004   (KR) ...................... 10-2004-0041920

(51) Int. Cl.  
*H04N 5/21* (2006.01)

(52) U.S. Cl. ..................................... 348/606

(58) Field of Classification Search ................ 348/606, 348/607, 624, 614, 700  
See application file for complete search history.

(56) References Cited

U.S. PATENT DOCUMENTS

| 4,410,912 | A | * | 10/1983 | Hess et al. ................... 348/625 |
| 4,549,213 | A | * | 10/1985 | Illetschko ................... 348/620 |
| 4,885,639 | A |   | 12/1989 | Nakata et al. |
| 5,260,791 | A |   | 11/1993 | Lubin |
| 5,285,277 | A |   | 2/1994  | Min |
| 5,446,501 | A | * | 8/1995  | Takemoto et al. ........... 348/620 |
| 5,602,591 | A | * | 2/1997  | Saiki ........................... 348/452 |
| 5,638,134 | A | * | 6/1997  | Kameyama et al. ......... 348/607 |
| 6,693,669 | B1 |  | 2/2004  | Wu et al. |
| 6,757,014 | B1 | * | 6/2004  | Kasahara ..................... 348/241 |
| 2004/0001632 | A1 | * | 1/2004 | Adachi ........................ 382/224 |
| 2004/0155983 | A1 | * | 8/2004 | Topper ........................ 348/624 |
| 2005/0168651 | A1 | * | 8/2005 | Morino ........................ 348/700 |
| 2006/0274618 | A1 | * | 12/2006 | Bourret ...................... 369/53.1 |

FOREIGN PATENT DOCUMENTS

| CN | 1189652    |    | 8/1998  |
| CN | 1440192    |    | 9/2003  |
| EP | 1001371    | A1 | 5/2000  |
| KR | 2003-70228 | A  | 8/2003  |
| KR | 2003-94772 | A  | 12/2003 |

OTHER PUBLICATIONS

Chinese Office Action dated Jan. 19, 2007 issued in CN 200510076175.1.  
Dutch Search Report issued on Jul. 13, 2006 in Dutch 1029195.

* cited by examiner

*Primary Examiner*—Paulos M Natnael  
(74) *Attorney, Agent, or Firm*—Stanzione & Kim LLP (57) ABSTRACT

In a method of removing a noise signal from a video signal and enhancing edge sharpness to improve the video signal definition, a different weight is assigned depending on a characteristic of input pixels. To this end, at least two pixel blocks including the input and at least two adjacent pixels. A pixel difference between the pixels in the each of the pixel blocks is calculated and one of the calculated pixel differences is selected. The input pixel is assigned with a weight corresponding to the selected pixel difference. Accordingly, the definition of the video signal is improved.

32 Claims, 8 Drawing Sheets

VIDEO SIGNAL PROCESSING APPARATUS AND METHOD TO ENHANCE IMAGE SHARPNESS AND REMOVE NOISE

CROSS-REFERENCE TO RELATED APPLICATIONS

This application claims the benefit under 35 U.S.C. § 119 (a) from Korean Patent Application No. 2004-41920, filed on Jun. 8, 2004 in the Korean Intellectual Property Office, the entire disclosure of which is incorporated herein by reference.

BACKGROUND OF THE INVENTION

1. Field of the Invention

The present general inventive concept generally relates to a video signal processing apparatus and method capable of enhancing image sharpness and removing noise. More particularly, the present general inventive concept relates to a video signal processing apparatus and method to remove a noise signal from an incoming video signal and to enhance sharpness of edges of the image signal so as to improve image definition.

2. Description of the Related Art

A cathode ray tube (CRT), which is a prevalent display device, is provided with an electron gun and a phosphorescent surface spaced more than a certain distance from the election gun to deflect an electron beam onto a display area. Accordingly, the CRT has a relatively large volume and a heavy weight in consideration of its screen size. Furthermore, there is a limit in realizing a flat and large-sized screen, and viewers are demanding a high quality and large-scale screen for a display device with the rapid development of technology.

To satisfy the demands of the viewers and overcome the drawbacks of the CRT, a liquid crystal display (LCD), a plasma display panel (PDP), a projection TV, and the like have been introduced. Such display devices can realize a slim, light-weight, and wide screen.

However, the display devices, such as the PDP and the projection TV, having a wide screen, are likely to reproduce an output video signal with a degraded definition due to a noise signal, blurring, and a band-limited signal of an input video signal. In particular, the noise signal in the input video signal causes deterioration of image sharpness and the blurring at edges of the image.

Figure 1:
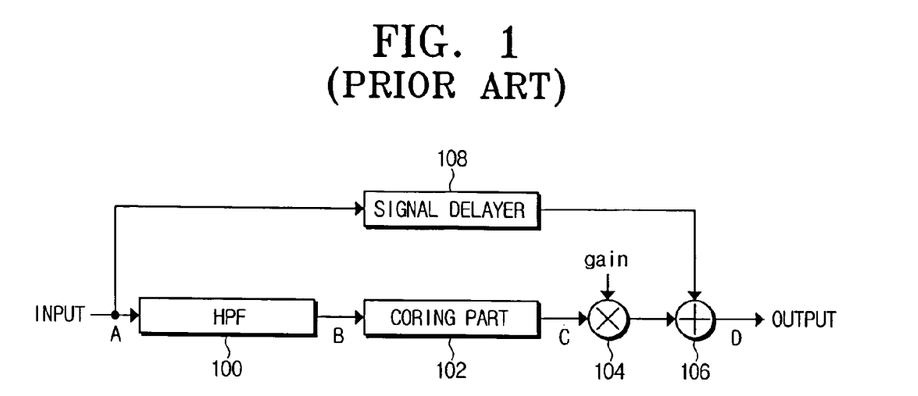
FIG. 1 illustrates a conventional video signal processing apparatus.

FIG. 1 is a block diagram illustrating a conventional video signal processing apparatus for removing a noise signal.

Referring to FIG. 1, the conventional video signal processing apparatus includes a high pass filter (HPF) 100, a coring part 102, a multiplier 104, a signal delayer 108, and an adder 106. An operation of the conventional video signal processing apparatus of FIG. 1 is described below with reference to FIGS. 2A through 2E.

Figure 2A:
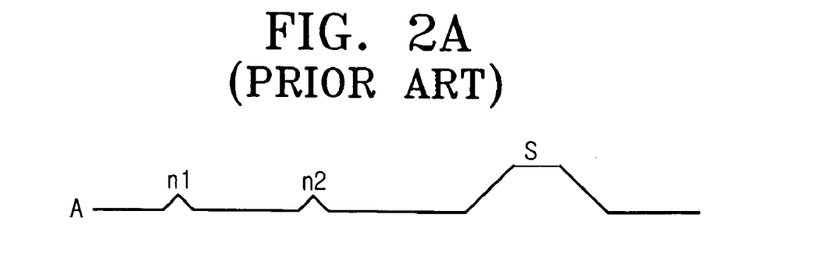
FIGS. 2A through 2E illustrate signals processed by the conventional video signal processing apparatus of FIG. 1.
Figure 2B:
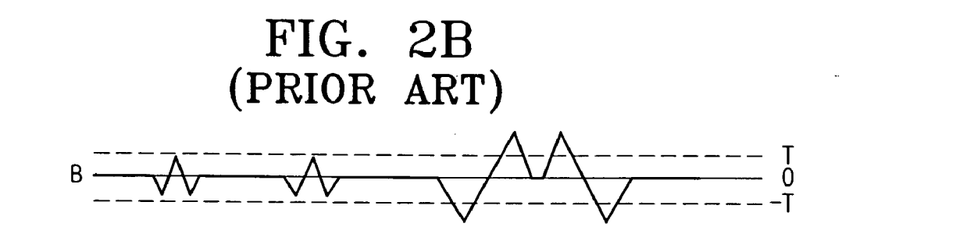

FIG. 2A depicts a waveform of a signal A input to the HPF 100. As illustrated in FIG. 2A, first and second noise signals n1 and n2 have a smaller amplitude than a normal signal S. The HPF 100 filters the input signal A and outputs a high frequency (HF) signal B illustrated in FIG. 2B.

Figure 2C:
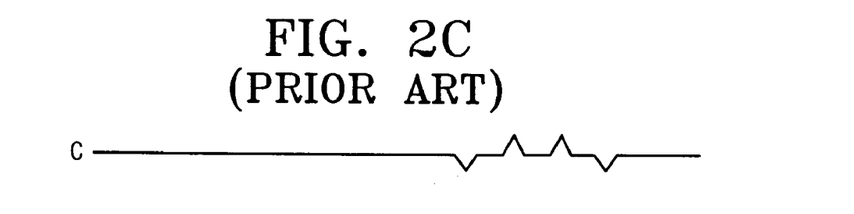

The coring part 102 prevents a boost-up of the first and second noise signals n1 and n2 in the HF signal B. The coring part 102 outputs a cored HF signal C having components lying outside of a predetermined threshold range $-T \sim +T$ with respect to the input signal A, that is, the coring part 102 outputs the cored HF signal C illustrated in FIG. 2C. The HF components of the first and second noise signals n1 and n2, which range within the predetermined threshold $-T \sim +T$, are filtered by the HPF 100 and removed by the coring part 102 as illustrated in FIG. 2C.

The multiplier 104 multiplies the cored HF signal C output from the coring part 102 by a gain having a positive or a negative value. The signal delayer 108 delays the input signal A for a certain time and outputs the delayed input signal A.

Figure 2D:
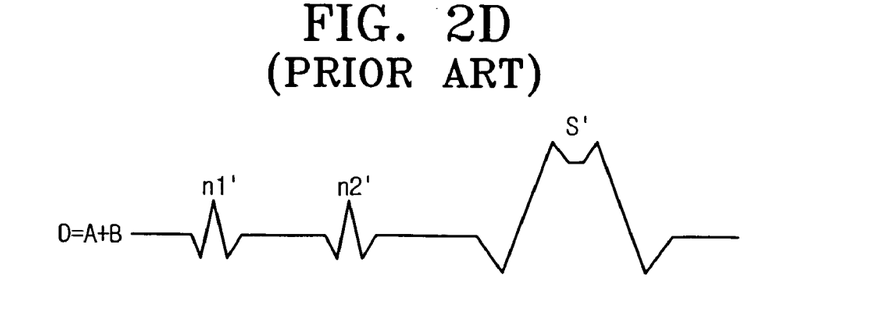
Figure 2E:
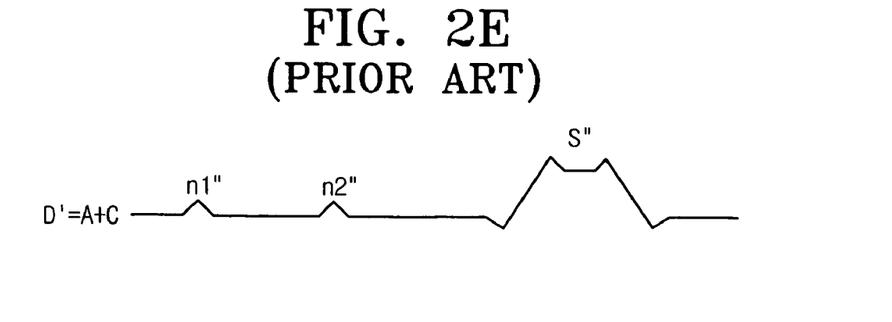

The adder 106 adds the signal output from the multiplier 104 with the delayed input signal A output from the signal delayer 108 output signal D. The output signal D output from the adder 105 has a waveform illustrated in FIG. 2D or FIG. 2E. FIG. 2D illustrates the added signal D of the uncored HF signal B and the delayed input signal A, and FIG. 2E illustrates the added signal D' of the cored HF signal C and the delayed input signal A.

Referring to FIG. 2D, the normal signal S of the input signal A is amplified to the normal signal S' to thus enhance the image sharpness. However, the first and second noise signals n1 and n2 of the input signal A are amplified to the noise signals n1' and n2' as well. Referring to FIG. 2E, the noise signal n1'' and n2'' and the normal signal S'' are not changed substantially from the first and second noise signals n1 and n1 and the normal signal S of the input signal A.

The above conventional video signal processing apparatus enhances a sharpness of a video image by preventing the boost-up of noise signals having a smaller amplitude than a normal signal in the incoming video signal and increasing the amplitude of the normal signal.

However, the conventional video signal processing apparatus is suitable for removing noise from a video signal having a few noise signals, but amplifies noise signals with the edge components accentuated when preventing the boost-up of the noise signals and adding to an original input signal in case of a RF video signal having many noise signals or a HF signal having considerable edge components. Therefore, there is a limit in improving the sharpness and the definition of the displayed image on the screen by preventing the boost-up of the noise signals.

SUMMARY OF THE INVENTION

The present general inventive concept provides a video signal processing apparatus capable of removing noise from an input video signal and enhancing edge sharpness so as to improve definition of the video signal.

Additional aspects and advantages of the present general inventive concept will be set forth in part in the description which follows and, in part, will be obvious from the description, or may be learned by practice of the general inventive concept.

The foregoing and/or other aspects and advantages of the present-general inventive concept may be achieved by providing a method of assigning a weight to an input pixel of a video signal including pixels that are sequentially input, the method including defining at least two pixel blocks including the input pixel and at least two adjacent pixels, calculating a pixel difference between the pixels in the each of the pixel blocks and selecting one of the calculated pixel differences, and assigning the input pixel a weight corresponding to the selected pixel difference.

The foregoing and/or other aspects and advantages of the present general inventive concept may also be achieved by providing an apparatus to assign a weight to an input pixel of a video signal including pixels that are sequentially input, the apparatus including an edge calculator to define at least two pixel blocks including the input pixel and at least two adjacent pixels, to calculate a pixel difference between the pixels in the each of the pixel blocks, and to select one of the calculated pixel differences, and a weight calculator to assign the input pixel a weight corresponding to the selected pixel difference.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the drawings.

Figure 3:
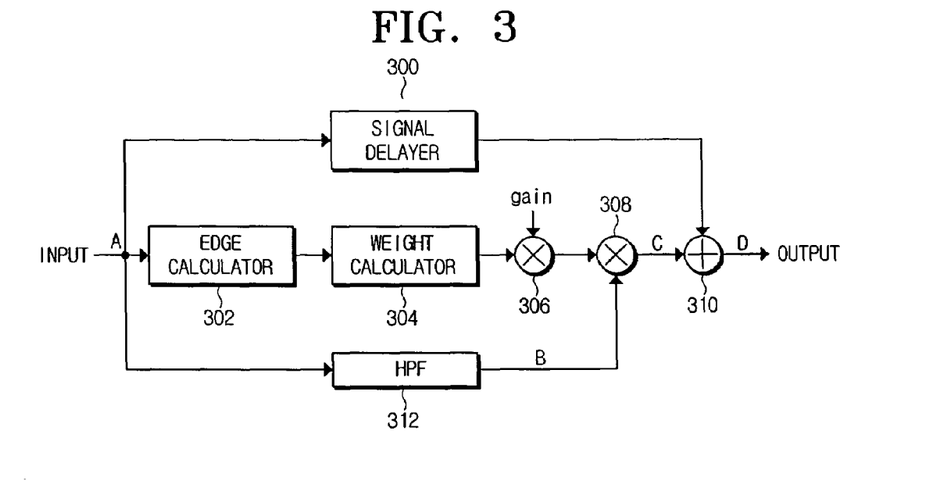
FIG. 3 illustrates a video signal processing apparatus according to an embodiment of the present general inventive concept.

FIG. 3 is a block diagram illustrating a video signal processing apparatus to remove a noise signal from an input signal A according to an embodiment of the present general inventive concept. Referring to FIG. 3, the video signal processing apparatus includes a signal delayer 300, an edge calculator 302, a weight calculator 304, first and second multipliers 306 and 308, an adder 310, and a high pass filter (HPF) 312. Although FIG. 3 illustrates a limited number of components in order to be concise, the video signal processing apparatus according to the present general inventive concept can further include components in addition to the above-mentioned components.

The edge calculator 302 determines whether input pixels are located in an edge region or in a flat region. Operations of the edge calculator 302 are described below with reference to FIGS. 4 through 6.

Figure 4:
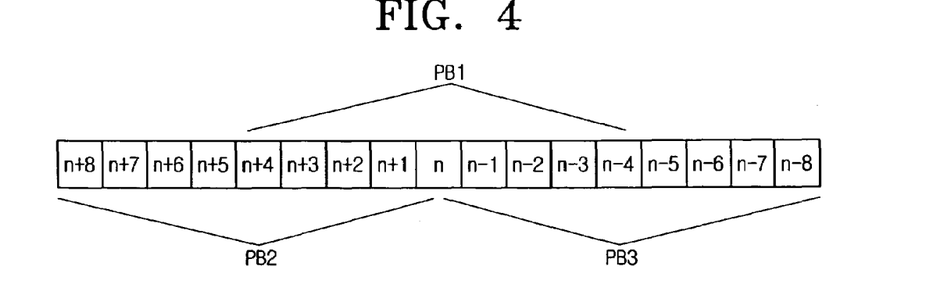
FIG. 4 illustrates pixel blocks used to measure edges according to an embodiment of the present general inventive concept.

FIG. 4 illustrates the input pixels. Referring to FIG. 4, the input pixels include an (n−8) pixel through an (n+8) pixel. The (n−8) pixel is the first input pixel and the (n+8) pixel is the last input pixel. The edge calculator 302 defines three pixel blocks of the input pixels in order to determine whether the input pixels corresponding to at least one of the defined three pixel blocks are located in an edge region or in a flat region.

Figure 5:
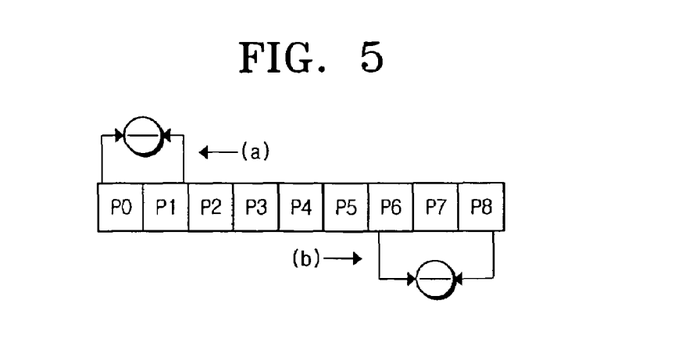
FIG. 5 illustrates obtaining a pixel difference between pixels in one of the pixel blocks of FIG. 4.

Each pixel block can include 9 pixels, as illustrated in FIGS. 4 and 5. It is to be understood that the number of pixels in the pixel block can vary depending on a user's setup.

As illustrated in FIG. 4, a first pixel block PB1 includes middle pixels of the input pixels, a second pixel block PB2 includes pixels on a left portion of the input pixels, and a third pixel block PB3 includes pixels on a right portion of the input pixels. The edges are determined with respect to the pixels in the pixel blocks.

FIG. 5 illustrates edges being determined with respect to the pixels in one of the pixel blocks. As described above, the pixel block can include 9 pixels, but is not limited to this number of pixels.

The edge calculator 302 calculates a difference between the pixels in the pixel block. FIG. 5 illustrates two methods of calculating the pixel difference. The first method (a) calculates the difference between adjacent pixels in the pixel block, and the second method (b) calculates the difference between separated pixels in the pixel block.

The first method (a) sequentially calculates a pixel difference between the pixels P0 and P1, a pixel difference between the pixels P1 and P2, a pixel difference between the pixels P2 and P3, etc. The second method (b) sequentially calculates a pixel difference between the pixels P0 and P2, a pixel difference between the pixels P1 and P3, a pixel difference between the pixels P2 and P4, etc. The second method (b) is not limited to pixels separated by only one pixel. The calculated pixel differences are used to determine the edges. The edge calculator 302 extracts values from the pixel differences acquired in the pixel block PB1 based on the following equations:

$$\text{diff\_max\_PB1} = \text{MAX}(|\text{diff\_0}|, |\text{diff\_1}|, \ldots, |\text{diff\_7}|) \quad [\text{Equation 1}]$$

$$\text{diff\_sum\_PB1} = |\text{diff\_0}| + |\text{diff\_1}| + \ldots + |\text{diff\_7}| \quad [\text{Equation 2}]$$

diff_0 is the pixel difference between the pixels P0 and P1, diff_1 is the pixel difference between the pixels P1 and P2, and diff_7 is the pixel difference between the pixels P7 and P8. Hereinafter, diff_max is a maximum pixel difference and diff_sum is a sum of the pixel differences. The edge calculator 302 extracts a maximum value (maximum pixel difference) from the pixel differences according to Equation 1, and a sum of the pixel differences according to Equation 2 with respect to each pixel block PB1, PB1, or PB3.

The edge calculator 302 calculates the pixel differences with respect to all of the pixels of each pixel block PB1, PB2, and PB3, and extracts the maximum value and the sum of the pixel differences of each pixel block PB1, PB2, PB3 using the calculated pixel differences based on Equation 1 and Equation 2, respectively.

The edge calculator 302 then selects a smallest value among the maximum values and a smallest value among the sums of the pixel differences with respect to the first, second, and third pixel blocks PB1, PB2, and PB3 according to the following equations:

$$\text{diff\_max} = \text{MIN}(\text{diff}_{max}\_\text{PB1}, \text{diff\_max\_PB2}, \text{diff\_max\_PB3}) \quad [\text{Equation 3}]$$

$$\text{diff\_sum} = \text{MIN}(\text{diff\_sum\_PB1}, \text{diff\_sum\_PB2}, \text{diff\_sum\_PB3}) \quad [\text{Equation 4}]$$

The edge calculator 302 extracts a smallest pixel difference from the maximum pixel differences of the first, second, and third pixel blocks PB1, PB2, and PB3 based on Equation 3 as the smallest value among the maximum values, and extracts the smallest value from the sums of the pixel values of the first, second, and third pixel blocks PB1, PB2, and PB3 based on Equation 4.

Figure 6A:
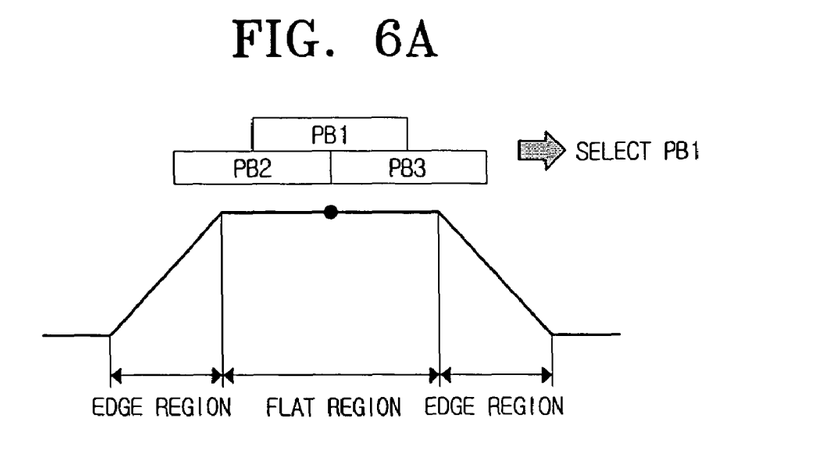
FIGS. 6A through 6C illustrate selecting a pixel block from the pixel blocks of FIG. 4 to calculate a weight.
Figure 6B:
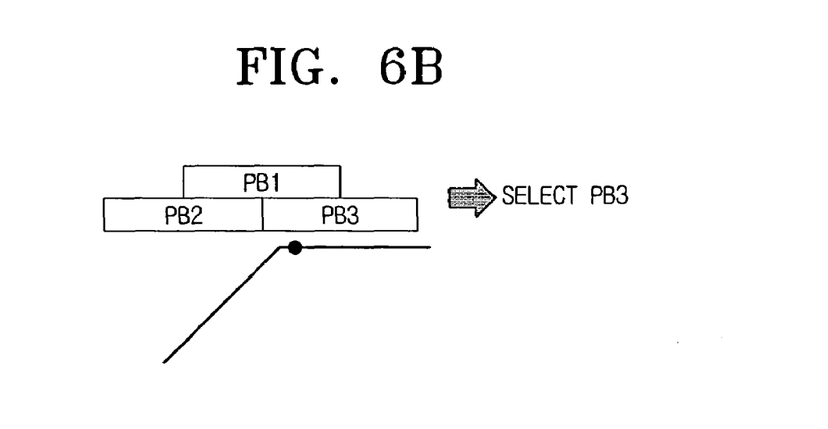
Figure 6C:
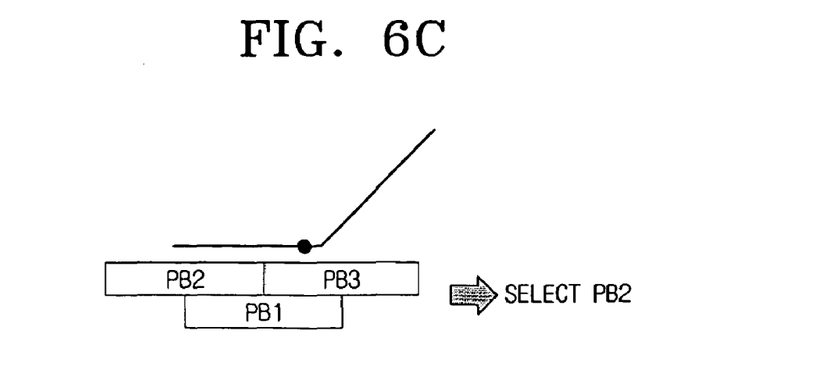

FIGS. 6A-6C illustrate one of the first, second, and third pixel blocks PB1, PB2, and PB3 being selected based on Equations 1 through 4. Specifically, FIG. 6A illustrates the edge determination with respect to a pixel in the flat region, and FIGS. 6B and 6C illustrate the edge determination with respect to pixels at a boundary of the flat region and the edge regions.

As illustrated in FIG. 6A, the first, second, and third pixel blocks PB1, PB2, and PB3, each including a predetermined number of pixels, are formed. The pixel differences in each pixel block PB1, PB2, and PB3 are calculated. The pixels in the first pixel block PB1, which are located in the flat region, have small pixel differences. That is, the first pixel block PB1 has a smaller maximum pixel difference than the second and third pixel blocks PB2 and PB3. The pixels in the second and third pixel blocks PB2 and PB3, which are located in the flat region and the edge regions, have larger pixel differences than the pixel block PB1. Hence, the edge calculator 302 selects the pixel block PB1 based on Equations 3 and 4 as illustrated in FIG. 6A.

As illustrated in FIG. 6B, the pixel block PB3 has a smaller maximum pixel difference than the pixel blocks PB1 and PB2 and the edge calculator 302 selects the pixel block PB3 based on Equations 3 and 4. As illustrated in FIG. 6C the pixel block PB2 has a smaller maximum pixel difference than the pixel blocks PB1 and PB3, and the edge calculator 302 selects the pixel block PB2 based on Equations 3 and 4.

The values of the maximum pixel difference and the sum of the pixel differences of the pixel block selected based on Equations 3 and 4 are supplied to the weight calculator 304. The weight calculator 304 generates a weight using the supplied values.

Figure 7:
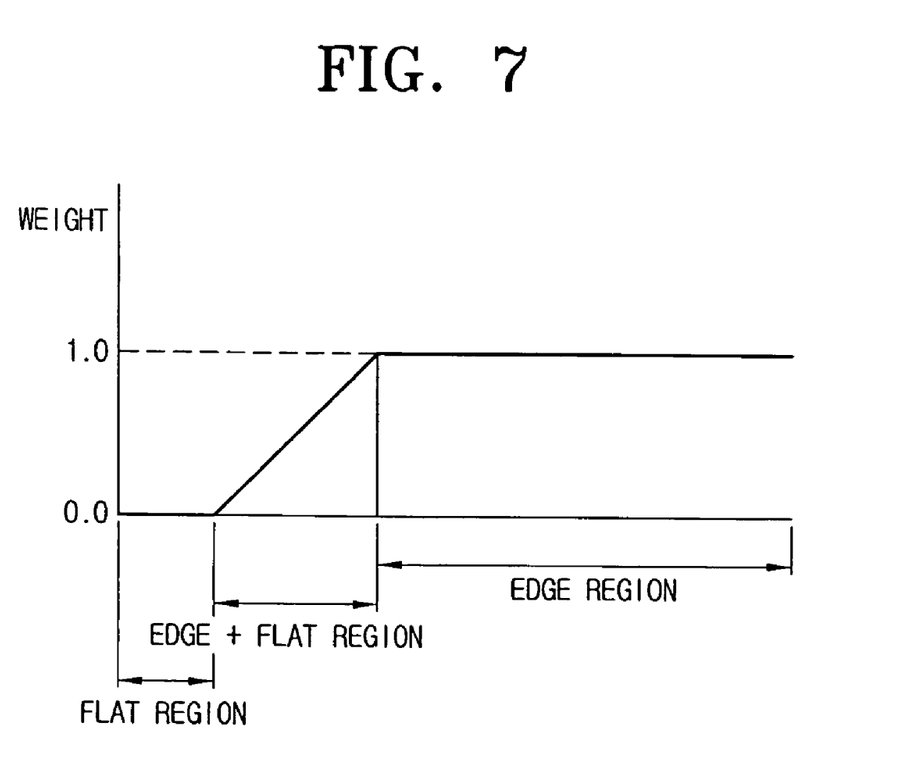
FIG. 7 illustrates applying the weight to a flat region and an edge region.
Figure 8:
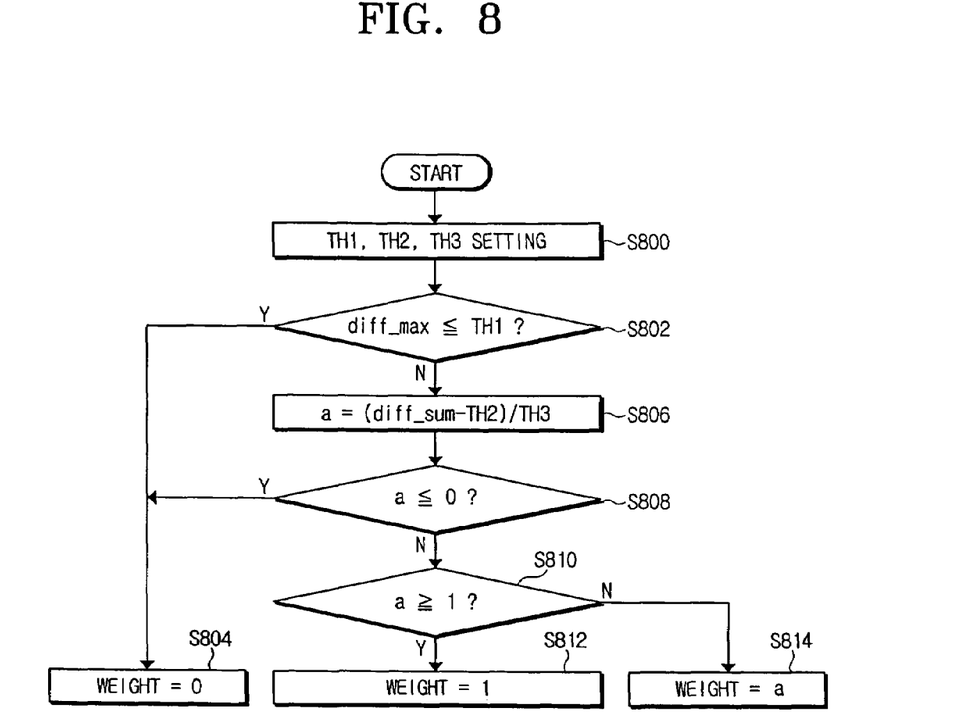
FIG. 8 illustrates operations of a weight calculator of the video signal processing apparatus of FIG. 3.

FIG. 7 illustrates weights calculated by the weight calculator 304. Referring to FIG. 7, a weight on a pixel in the flat region is zero, and a weight on a pixel in the edge region is 1. A pixel located at the boundary of the flat region and the edge region is assigned with a weight ranging from 0 to 1. FIG. 8 illustrates the weight calculator 304 calculating the weights.

Referring to FIG. 8, the weight calculator 304 sets first, second, and third thresholds TH1, TH2 and TH3 at operation S800. The second threshold TH2 is greater than the first threshold TH1 and less than the third threshold TH3. The first, second, and third thresholds TH1, TH2 and TH3 can vary depending on the user's setup.

The weight calculator 304 compares the value of the maximum pixel difference (diff_max) obtained based on Equation 3 with the first threshold TH1 at operation S802. When diff_max is equal to or less than the first threshold TH1, the weight calculator 304 proceeds to operation S804. When diff_max is greater than the first threshold TH1, the weight calculator 304 proceeds to operation S806. At operation S804, the weight calculator 304 assigns the weight of 0.

At operation S806, the weight calculator 304 calculates a value 'a' using the sum of the pixel differences (diff_sum) acquired based on Equation 4. That is, the value 'a' equals (diff_sum-TH2)/TH3. The weight calculator 304 then determines whether the value 'a' is equal to or less than zero at operation S808. If so, the weight calculator 304 proceeds to operation S804, and if not, the weight calculator 304 proceeds to operation S810.

At operation S810, the weight calculator 304 determines whether the value 'a' is equal to or greater than 1. If so, the weight calculator 304 assigns the weight of 1 at operation S812. If not, the weight calculator 304 assigns the weight of the value 'a' at operation S814.

FIGS. 9A through 9D where the weight calculator 304 sets various weights to various signals through the operations of FIG. 8.

Figure 9A:
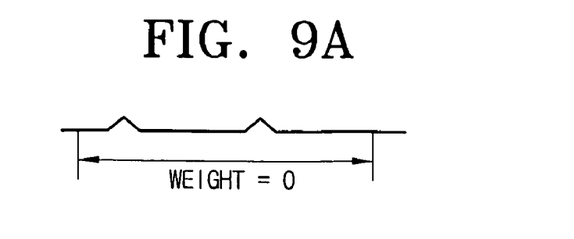
FIGS. 9A through 9D illustrate where various weights are applied to a characteristic of an input signal.
Figure 9B:
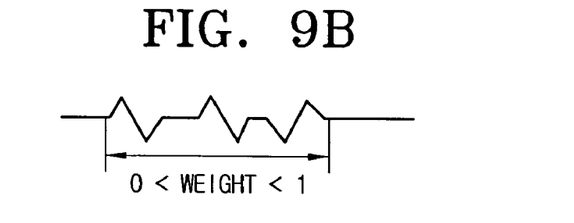

In FIG. 9A, a current pixel is located in the flat region having no edges. It is noted that the weight of 0 is assigned when the flat region is determined to have only a few noises. In FIG. 9B, when the region including the current pixel has a small edge or noise, the weight ranging from 0 to 1 is assigned depending on diff_max and diff_sum as described above.

Figure 9C:
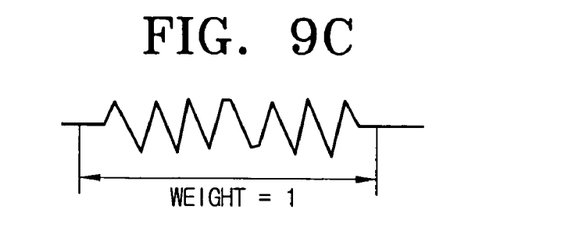
Figure 9D:
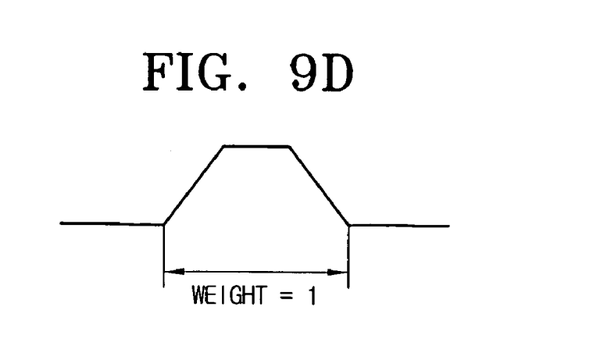

In FIGS. 9C and 9D, when the current pixel is located in a region having small edges or larger edges, the weight of 1 is assigned.

The weight calculated by the weight calculator 304 is provided to the first multiplier 306. The first multiplier 306 multiplies the weight from the weight calculator 304 by a gain. The calculation of the gain will be omitted for conciseness.

The HPF 312 filters the input signal A and provides an high frequency (HF) signal B to the second multiplier 308. The second multiplier 308 multiplies the HF signal B provided from the HPF 312 by the signal received from the first multiplier 306. The second multiplier 308 provides the multiplied signal C to the adder 310. The adder 310 adds the input signal A signal delayed by the signal delayer 300 and the multiplied signal C provided from the second multiplier 308, and outputs a resultant output signal D.

Figure 10A:
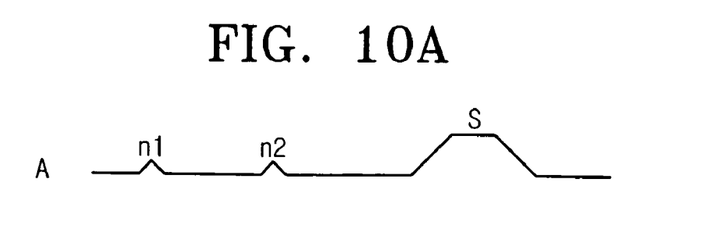
FIGS. 10A through 10E illustrate signals processed by the video signal processing apparatus of FIG. 3.
Figure 10B:
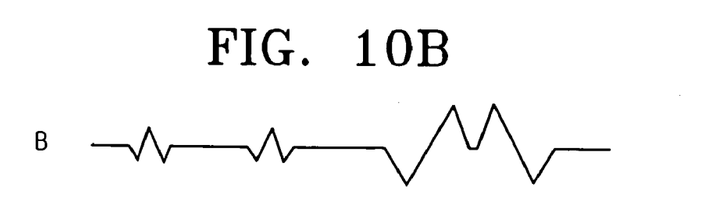

FIGS. 10A through 10E illustrate the signals processed by the video signal processing apparatus of FIG. 3. FIG. 10A illustrates a waveform of the input signal A. Referring to FIG. 10A, the input signal A includes a normal signal S and first and second noise signals n1 and n2 having a small amplitude as compared to the normal signal S. FIG. 10B illustrates the high frequency (HF) signal B output from the HPF 312 by filtering the input signal A.

Figure 10C:
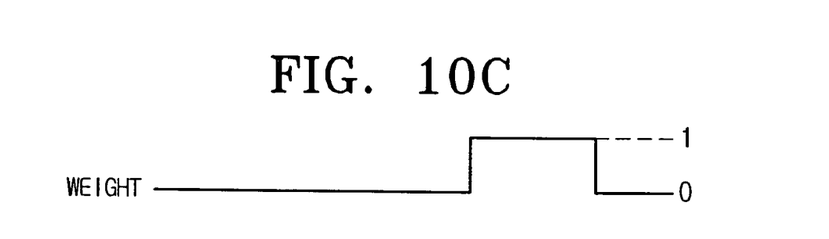
Figure 10D:
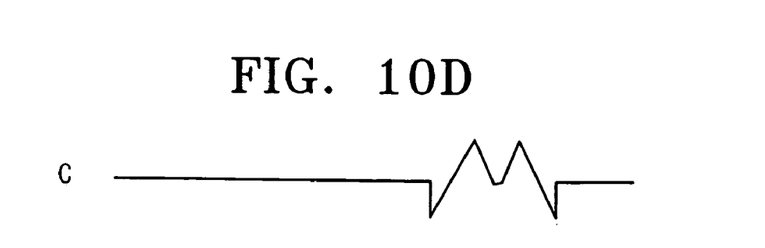

FIG. 10C illustrates a weight signal calculated by the edge calculator 302 and the weight calculator 304 with respect to the input signal A, and FIG. 10D illustrates the multiplied signal C output from the second multiplier 308 by multiplying the HF signal B of FIG. 10B by the weight signal of FIG. 1C. Finally, FIG. 10E illustrates the output signal D output by adding the input signal A of FIG. 10A delayed by the signal delayer 300 with the multiplied signal C of FIG. 10D.

Figure 10E:
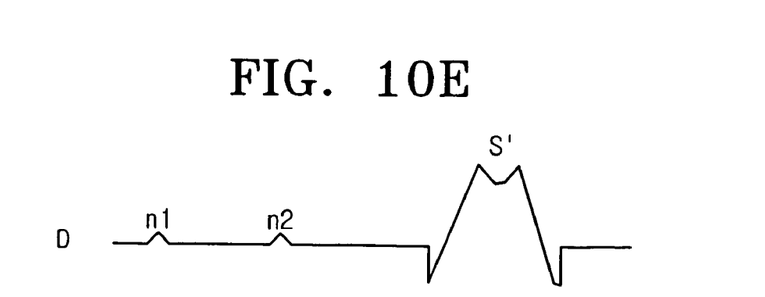

When comparing the input signal A of FIG. 10A with the output signal D of FIG. 10E, the first and second noise signals n1 and n2 are not amplified but the normal signal S is amplified, thus enhancing the video image sharpness.

According to the present general inventive concept as described above, a sharpness of pixels is enhanced by assigning a different weight to an input pixel depending on a region of the input pixel. Specifically, small noises in the background (flat region) of the image or noises around the large edges are not amplified to thus enhance the image sharpness.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of assigning a weight to an input pixel of a video signal including pixels that are sequentially input, the method comprising:
   defining at least two pixel blocks each including the input pixel and at least two adjacent pixels;
   calculating a pixel difference between the pixels in the each of the pixel blocks and selecting one of the calculated pixel differences; and assigning the input pixel a weight corresponding to the selected pixel difference.

2. The method of claim 1, wherein the calculating of the pixel difference comprises:
sequentially calculating pixel differences between the adjacent pixels in each of the pixel blocks.

3. The method of claim 1, wherein the selecting of one of the calculated pixel differences comprises:
selecting a largest pixel difference for each of the pixel blocks; and
selecting a smallest pixel difference from the selected largest pixel differences of the pixel blocks.

4. The method of claim 3, wherein the assigning of the input pixel the weight comprises:
assigning the input pixel a weight of 0 when the selected smallest pixel difference is equal to or less than a first predetermined value.

5. The method of claim 4, wherein the assigning of the input pixel the weight comprises:
assigning the input pixel a weight of 1 when the selected smallest pixel difference is greater than a second predetermined value.

6. The method of claim 1, wherein the at least two pixel blocks comprises a first pixel block including the input pixel located in a middle of the first pixel block and a second pixel block including the input pixel located on an edge of the second pixel block.

7. A method of processing a video image signal, the method comprising:
filtering an input signal using a high pass filter;
generating a weight signal corresponding to the input signal according to pixel differences of pixels of the input signal;
multiplying the filtered input signal and the generated weight signal;
delaying the input signal; and
adding the multiplied signal to the delayed input signal.

8. The method of claim 7, wherein the generating of the weight signal comprises:
grouping the pixels of the input signal into overlapping pixel blocks;
determining a pixel difference value for each pixel of each pixel block;
calculating a maximum pixel difference value and a sum of the pixel difference values for each pixel block; and
determining a weight of each pixel of the input signal according to a smallest calculated maximum pixel difference value and a smallest calculated sum of the pixel difference values such that the weight signal is generated according to the determined weight.

9. The method of claim 8, wherein the determining of the pixel difference value for each pixel of each pixel block comprises:
determining the pixel difference value between each pixel of each pixel block and at least one adjacent pixel.

10. The method of claim 8, wherein the determining of the pixel difference value for each pixel of each pixel block comprises:
determining the pixel difference value between each pixel of each pixel block and at least one other pixel within the pixel block spaced a predetermined number of pixels away.

11. The method of claim 8, wherein the determining of the weight comprises:
determining the weight of each pixel of the input signal to be in a range between 0 and 1 inclusive.

12. The method of claim 8, wherein the determining of the weight comprises:
comparing the smallest calculated maximum pixel value and a smallest calculated sum of the pixel values to a plurality of threshold values.

13. The method of claim 7, wherein the generating of the weight signal comprises:
defining flat regions and edge regions of the input signal; and
weighting each pixel of the input signal according to whether each pixel of the input signal is in one of the flat regions or one of the edge regions.

14. The method of claim 13, wherein the weighting of each pixel of the input signal comprises:
assigning a weight of zero to pixels determined only to be in one of the flat regions;
assigning a weight of one to pixels determined only to be in one of the edge regions; and
assigning a weight between zero and one to pixels determined to in one of the flat regions and in one of the edge regions.

15. The method of claim 7, wherein the generating of the weight signal comprises:
grouping the pixels of the input signal into overlapping pixel blocks; and
when one of the pixels is in more than one pixel block, comparing maximum pixel differences of each pixel block the pixel is in to determine a smallest maximum pixel difference comparing sums of the pixel differences of each pixel block the pixel is in to determine a smallest sum of the pixel differences, and weighting the pixel according to the determined smallest maximum pixel difference and the determined smallest sum of the pixel differences.

16. The method of claim 15, wherein the generating of the weight signal further comprises:
when one of the pixels is in only one pixel block, weighting the pixel according to the maximum pixel difference and the sum of the pixel differences of the pixel block that the pixel is in.

17. An apparatus to assign a weight to an input pixel of a video signal including pixels that are sequentially input, the apparatus comprising:
an edge calculator to define at least two pixel blocks each including the input pixel and at least two adjacent pixels, to calculate a pixel difference between the pixels in the each of the pixel blocks, and to select one of the calculated pixel differences; and
a weight calculator to assign the input pixel a weight corresponding to the selected pixel difference.

18. The apparatus of claim 17, wherein the edge calculator sequentially calculates pixel differences between the adjacent pixels in each of the pixel blocks.

19. The apparatus of claim 17, wherein the edge calculator selects a largest pixel difference in each of the pixel blocks, and selects a smallest pixel difference from the selected largest pixel differences.

20. The apparatus of claim 19, wherein the weight calculator assigns zero as the weight of the input pixel when the smallest pixel difference selected is equal to or smaller than a first predetermined value.

21. The apparatus of claim 20, wherein the weight calculator assigns 1 as the weight of the input pixel when the smallest pixel difference selected is greater than a second predetermined value.

22. The apparatus of claim 17, wherein the edge calculator makes pixel blocks comprising a first pixel block including the input pixel located in the middle of the first pixel block and a second pixel block including the input pixel located on an edge of the second pixel block.

23. A video signal processing apparatus, comprising:
a signal delayer to delay an input signal;
a signal weighting unit to generate a weight signal corresponding to the input signal according to pixel differences of pixels of the input signal;
a high pass filter to filter the input signal;
a multiplier to multiply the filtered signal and the weight signal to output a multiplied signal; and
an adder to add the multiplied signal and the delayed input signal to output an output signal.

24. The video signal processing apparatus of claim 23, wherein the signal weighting unit comprises:
an edge calculator to group the pixels of the input signal into a plurality of overlapping pixel blocks, to determine a pixel difference between each pixel of each pixel block and other pixels of each pixel block, and to calculate a maximum pixel difference and a sum of the pixel differences for each pixel block; and
a weight calculator to calculate a weight for each pixel of the input signal according to the smallest calculated maximum pixel difference and a smallest calculated sum of the pixel difference, and to output the weight signal comprising the calculated weights for each pixel of the input signal such that the weight signal is generated according to the calculated weights.

25. The video signal processing apparatus of claim 24, wherein the calculated weight for each pixel is within a range between 0 and 1 inclusive.

26. The video signal processing apparatus of claim 24, wherein the weighting unit further comprises:
a gain multiplier to multiply the weight signal output by the weight calculator by a predetermined gain.

27. The video signal processing apparatus of claim 24, wherein the edge calculator determines the pixel difference between each pixel of each pixel block and at least one adjacent pixel.

28. The video signal processing apparatus of claim 24, wherein the edge calculator determines the pixel difference between each pixel of each pixel block and at least one pixel within the pixel block spaced a predetermined number of pixels away.

29. The video signal processing apparatus of claim 23, wherein the weighting apparatus defines flat regions and edge regions of the input signal according to the pixel differences of the pixels of the input signal and weights the pixels of the input signal according to the defined flat regions and edge regions.

30. The video signal processing apparatus of claim 29, wherein when the weighting unit determines that one of the pixels of the input signal is only in one of the flat regions, the weighting unit sets a weight of the pixel to be zero.

31. The video signal processing apparatus of claim 29, wherein when the weighting unit determines that one of the pixels of the input signal is only in one of the edge regions, the weighting unit sets a weight of the pixel to be one.

32. The video signal processing apparatus of claim 29, wherein when the weighting unit determines that one of the pixels of the input image signal is in one of the flat regions and in one of the edge regions, the weighting unit sets a weight of the pixel to be between zero and one.

* * * * *

UNITED STATES PATENT AND TRADEMARK OFFICE
CERTIFICATE OF CORRECTION

PATENT NO.        : 7,633,556 B2                                    Page 1 of 1
APPLICATION NO. : 11/143454
DATED             : December 15, 2009
INVENTOR(S)       : Kyung-sun Min It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1190 days.

Signed and Sealed this

Ninth Day of November, 2010

David J. Kappos
*Director of the United States Patent and Trademark Office*